US008566013B2

(12) United States Patent
Davis et al.

(10) Patent No.: US 8,566,013 B2
(45) Date of Patent: Oct. 22, 2013

(54) ELECTRIC VEHICLE (EV) DRIVING MODE OPTIMIZATION FOR A PARALLEL HYBRID ELECTRIC VEHICLE

(75) Inventors: Scott William Davis, Marshall, MI (US); Thomas R. Connolly, Portage, MI (US); Zhanjiano Zou, Lasalle (CA); Richard A. Nellums, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 1132 days.

(21) Appl. No.: 12/121,238

(22) Filed: May 15, 2008

(65) Prior Publication Data
US 2009/0287366 A1 Nov. 19, 2009

(51) Int. Cl.
*G06F 19/00* (2011.01)

(52) U.S. Cl.
USPC ..... 701/123; 701/22; 180/65.21; 180/65.225; 180/65.25; 180/65.265; 180/65.28; 180/65.285

(58) Field of Classification Search
USPC .................. 701/22, 29, 123; 180/65.1, 65.21, 180/65.22, 65.245, 65.25, 65.265, 65.27, 180/65.28, 65.285
See application file for complete search history.

(56) References Cited

U.S. PATENT DOCUMENTS

| 5,561,362 | A * | 10/1996 | Kawamura et al. | 320/134 |
|---|---|---|---|---|
| 6,064,180 | A * | 5/2000 | Sullivan et al. | 320/132 |
| 6,137,250 | A * | 10/2000 | Hirano et al. | 318/376 |
| 6,397,601 | B2 | 6/2002 | Morimoto et al. | |
| 6,484,833 | B1 * | 11/2002 | Chhaya et al. | 180/65.225 |
| 7,127,337 | B2 * | 10/2006 | Bennett et al. | 701/22 |
| 7,222,004 | B2 * | 5/2007 | Anderson | 701/22 |
| 7,490,000 | B2 * | 2/2009 | Siddiqui et al. | 701/104 |
| 7,533,744 | B2 * | 5/2009 | Mack | 180/65.265 |
| 7,617,894 | B2 * | 11/2009 | Ozeki et al. | 180/65.21 |
| 7,689,331 | B2 * | 3/2010 | Moran | 701/22 |
| 7,699,129 | B2 * | 4/2010 | Treharne et al. | 180/65.265 |
| 7,898,405 | B2 * | 3/2011 | Burke et al. | 340/461 |
| 2005/0224264 | A1 | 10/2005 | Perrin | |
| 2006/0148613 | A1 | 7/2006 | Seksaria et al. | |
| 2008/0275601 | A1 * | 11/2008 | Saito et al. | 701/22 |
| 2009/0139781 | A1 * | 6/2009 | Straubel | 180/65.1 |
| 2009/0150015 | A1 * | 6/2009 | Okubo et al. | 701/22 |
| 2010/0025131 | A1 * | 2/2010 | Gloceri et al. | 180/65.28 |

OTHER PUBLICATIONS

International Search Report for PCT/IB2009/05580.

\* cited by examiner

*Primary Examiner* — Thomas Black
*Assistant Examiner* — Peter D Nolan
(74) *Attorney, Agent, or Firm* — Rader, Fishman & Grauer PLLC

(57) ABSTRACT

A method of operating a parallel hybrid electric drive train may include manually selecting a first mode by a user. The first mode include an electric mode that provides for propelling a vehicle using only an electric motor. The method may also include propelling the vehicle in the electric mode, limiting an allowed vehicle acceleration below a predetermined acceleration value, detecting a battery state of charge, and preventing an engine start during operation in the electric mode.

22 Claims, 3 Drawing Sheets

ELECTRIC VEHICLE (EV) DRIVING MODE OPTIMIZATION FOR A PARALLEL HYBRID ELECTRIC VEHICLE

TECHNICAL FIELD

The disclosure generally relates to driving modes of parallel hybrid electric vehicles.

BACKGROUND

Typical parallel hybrid electric vehicles include an internal combustion engine, an electric motor, and a battery. Parallel hybrid electric vehicles typically operate using the electric motor and/or the internal combustion engine as prime movers to propel the vehicle. That is, the vehicle wheels may be rotated using only the electric motor, only the engine, or using some combination of torque from both prime movers. Generally, the vehicle may be operated at low speeds with the electric motor only, and during periods of high acceleration and/or high vehicle speeds with a combination of both the engine and the motor. Typically, the engine and/or a regenerative brake may be used to recharge the battery, and the battery may be used to rotate the motor.

When the engine is used to recharge the battery, the motor may be used to propel the vehicle during the electric only operation. Further, the engine may propel the vehicle during engine only operation while rotating the motor (as a generator) to recharge the battery. A hybrid electric system will typically maintain the state of charge of the battery within a prescribed range. That is, the battery may be used to power the motor to propel the vehicle with the engine not operating for extended periods while the battery state of charge is within, for example, between forty percent (40%) and eighty percent (80%) of maximum charge. A controller for a hybrid electric vehicle may automatically initiate charging of the battery when the state of charge falls below fifty percent (50%) of maximum charge during vehicle operation. Many hybrid electric vehicles operate the engine, motor and battery while targeting a desired state of charge value for the battery. That is, if the state of charge (expressed as a percentage of maximum) falls below the desired value (or range), the battery will be charged, and if the state of charge exceeds the desired value (or range), the battery will be discharged, usually by providing torque to propel the vehicle.

Generally, the operator may not know when the vehicle will switch from the electric only operation to operations using the engine, and the operator cannot control the amount of charge (state of charge) of the battery, as the vehicle will typically maintain the state of charge automatically. Further, the operator will not know the range available for operating without the engine propelling the vehicle.

Many regenerative brakes operate as a mechanism that reduces vehicle speed by converting some of the vehicle's kinetic energy into another useful form of energy. This captured energy may be then stored for future use, such as in the battery, or fed back into other vehicle components, such as is disclosed in commonly owned U.S. Pat. Nos. 4,246,988; 4,986,383; and 7,076,946. The regenerative brake may use the motor as a generator to convert kinetic energy to electricity, or other components may be used to generate electricity.

While many parallel hybrid electric vehicles include numerous controls, an operator may not be able to control the operation of the engine, or the battery state of charge before or during electric only operation. Further, an operator may not know when the engine will start during electric only operation.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figure 1:
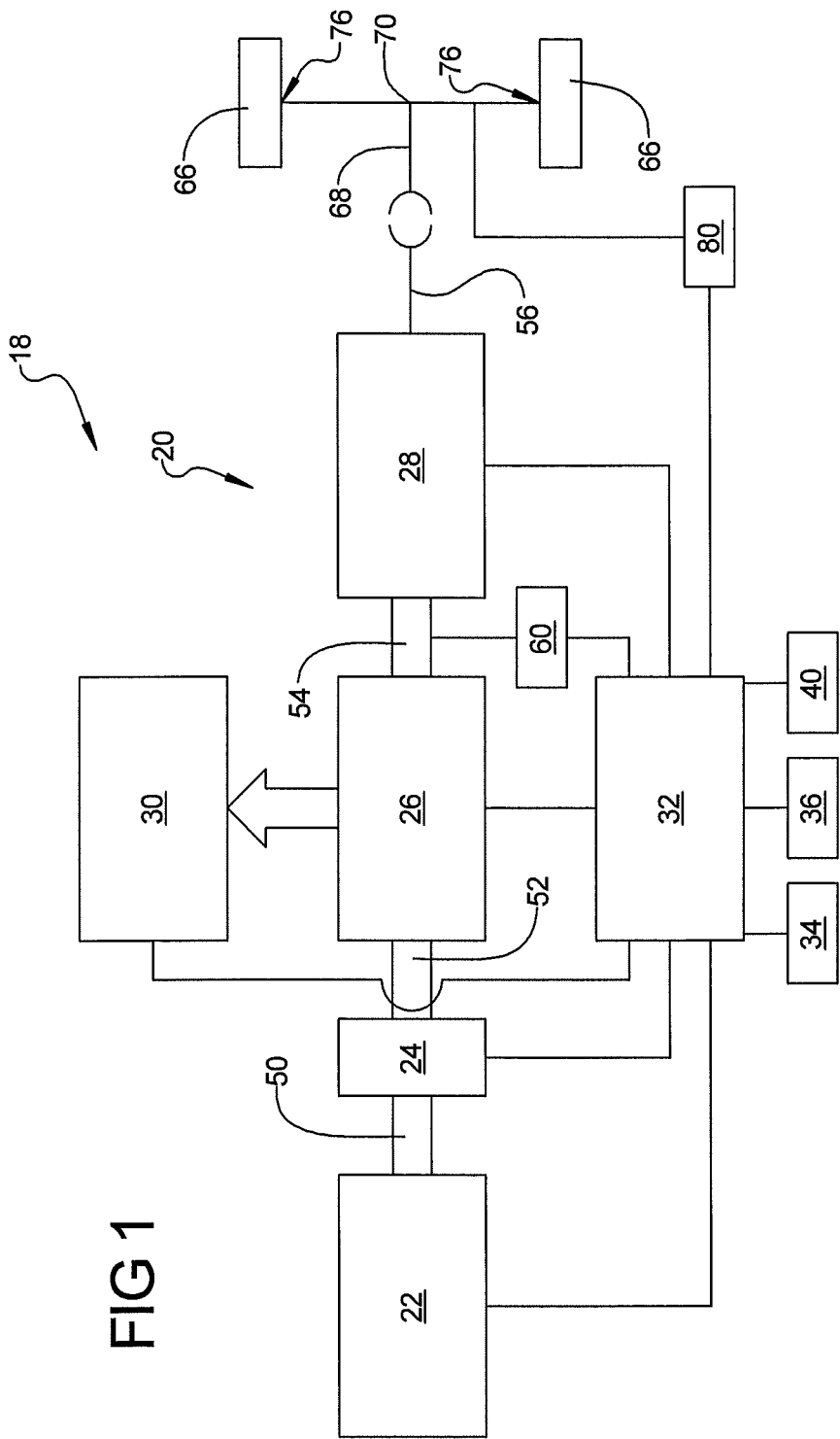
FIG. 1 is a schematic of a hybrid vehicle powertrain system, according to an exemplary embodiment.

FIG. 1 schematically illustrates a vehicle 18 having a hybrid vehicle powertrain system 20. The hybrid vehicle powertrain system 20 includes an internal combustion engine 22, a clutch assembly 24, a motor-generator 26, a transmission 28, a battery portion 30, a controller 32, a user interface 34, and an ignition 36. Engine 22 and motor-generator 26 are examples of prime movers for vehicle 18. The system 20 may also include a decibel meter 40, a power take off (PTO) (not shown) and a PTO powered device (not shown). According to one exemplary approach, the motor 26—generator is an electric motor configured to rotate at least a portion of the clutch assembly 24. In the embodiment illustrated, the motor-generator 26 (or motor 26) may operate as a motor for transforming electrical energy into mechanical energy, and may also operate as a generator for transforming mechanical energy (rotation of a shaft) into electrical energy. The controller 32 may be a processor or microprocessor configured for detecting parameters and providing outputs as discussed in greater detail herein. The ignition 36 may be used for starting the system 20, although the controller 32 may be operational and perform functions even with the ignition in an off configuration.

Controller 32 may be electronically and microprocessor-controlled and for providing output information to an electronic data link DL, preferably conforming to the industry standard SAE J1939 or a comparable protocol. A data link, conforming to the SAE J1939 protocol or a comparable protocol, transmits information by which information associated with the prime mover and related components. Controller 32 may be a single controller or one of a series of interconnected controllers. Although not shown, controller 32 may be of general construction having a central processing unit (CPU), various co-processors, a read only memory (ROM), a random access memory (RAM), an input for selectively receiving data via a data link from various vehicle components including the prime movers and related components, an output for selectively transmitting command output signals, and a bi-directional bus interconnecting the components.

The engine 22 includes an output engine shaft 50 and the motor 26 includes a motor input shaft 52 and the transmission 28 includes a transmission input shaft 54 and at least one transmission output shaft 56. The clutch assembly 24 selectively couples the engine 22 to the motor 26. The system 20 also includes a transmission input shaft speed sensor 60. Generally, the motor input shaft 52 is coupled for rotation with the transmission input shaft 54 such that the transmission input shaft speed sensor 60 will detect movement of the motor input shaft 52.

Also in the illustrative arrangement of FIG. 1, a transmission output rotation from the transmission output shaft 56 is distributed to wheels 66 through a drive shaft 68 and a differential 70. The wheels 66 are at least partially controlled by brakes 76 that may include a regenerative braking system 80. In the illustrative embodiment of FIG. 1, the regenerative braking system 80 is illustrated as a separate assembly than the motor-generator 26, although the motor-generator 26 may be used as a regenerative braking system.

As discussed in greater detail below, the controller 32 may calculate the battery state of charge and compare a value for such a charge to a lower threshold for state of charge. The resulting comparison may be used to calculate a distance that the vehicle 18 can travel before the battery portion state of charge reaches the lower threshold. Generally, the methods presented herein are controlled by the controller 32 when the ignition 36 is in an on configuration. In one approach the methods are continuously controlled by the controller 32.

The user interface 34 may be manually actuated by a vehicle operator or user (not shown) to send a command to the controller 32 to select from a variety of modes. Illustrative modes include silent mode, silent preparation mode, and a parallel hybrid (normal) mode. The user interface 34 may not allow both the silent mode and the silent preparation mode to be selected simultaneously. That is, a command through the user interface 34 to the controller 32 to select the silent mode, the silent preparation mode, or the parallel hybrid mode may cancel any previous selection (or de-select) of the mode that was previously selected.

A first mode, or silent mode, is provided by the controller 32 where the engine 22 is not permitted to propel the vehicle 18. That is, the engine 22 will not supply torque to the wheels 66. Generally, an engine, such as the engine 22 will emit a high level of noise when propelling a vehicle when compared to a motor, such as the motor 26, when propelling a vehicle. The motor 26 may emit a level of noise that is below the background noise of the operating environment of the vehicle 18, thereby resulting in audibly undetectable propulsion of the vehicle 18.

Figure 2:
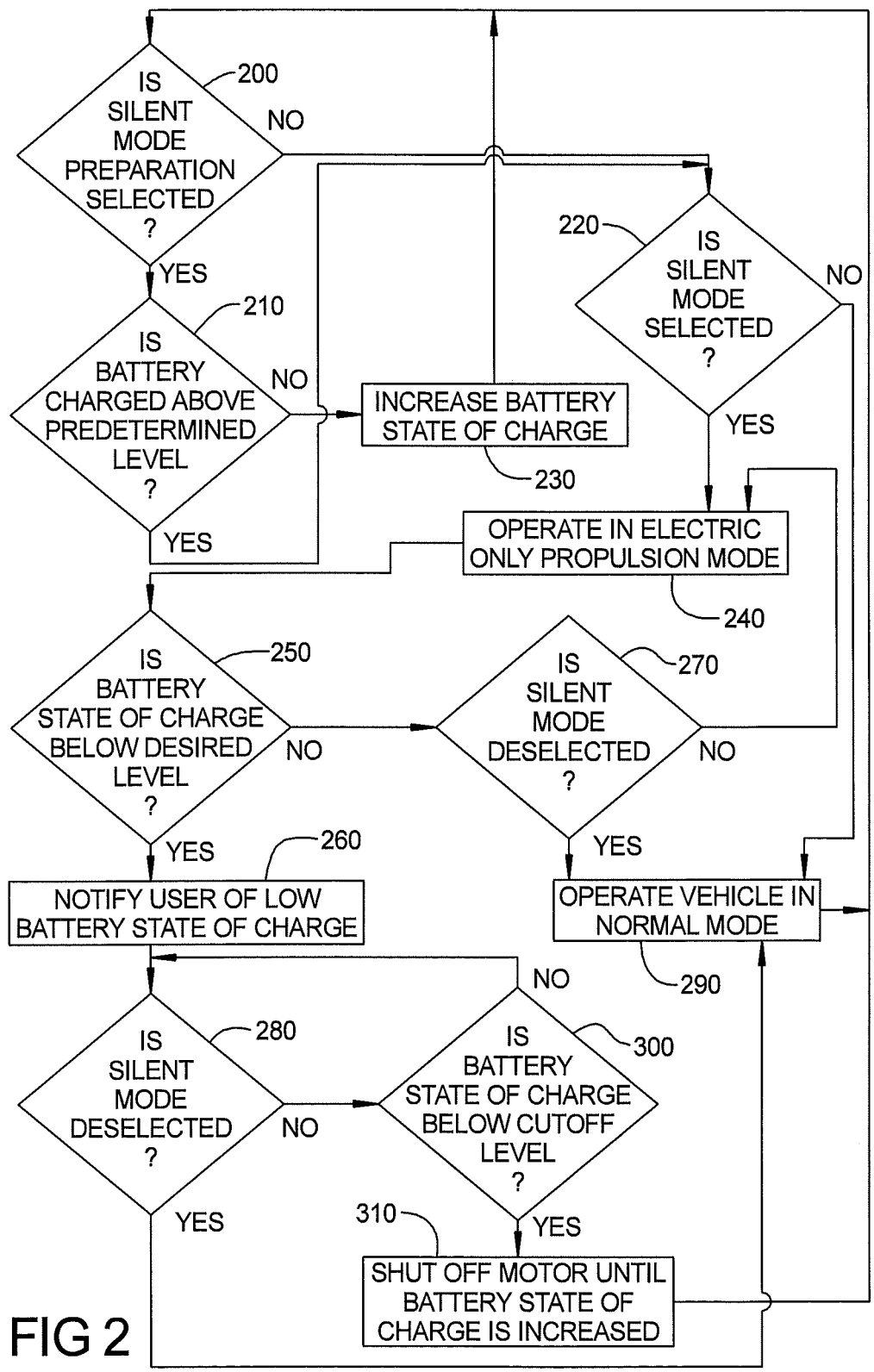
FIG. 2 is a flow chart illustrating steps of a method according to an exemplary embodiment

FIG. 2 illustrates an exemplary flowchart of a method according to an illustrative embodiment. The method may begin in step 200 where a controller, such as the controller 32 determines whether the user has selected the silent preparation mode through the user interface 34. If the determination in step 200 is positive, the logic continues to step 210, if the determination in step 200 is negative, the method continues to step 220.

In step 210, the controller 32 may determine whether the battery portion 30 is charged above a predetermined start state of charge. The start state of charge may be dependent upon other variables of the vehicle 18, but generally, the start state of charge will be established as a value of state of charge at the higher end of the battery capacity. In one embodiment, the start state of charge will be about ninety percent (90%) of maximum. If the determination in step 210 is positive, the logic continues to step 220. If the determination in step 210 is negative, the method continues to step 230.

In step 220, the controller may determine whether the user has selected the silent mode. If the determination in step 220 is positive, the logic continues to step 240, if the determination in step 220 is negative, the method continues to step 290 (discussed in greater detail below).

In step 230, the controller may charge the battery portion 30. In the silent preparation mode, (the loop that include steps 210 and 230) the controller 32 will operate the engine 22 to charge the battery portion 30 to about the start state of charge. That is, since the controller 32 may operate the motor 26 as a generator, the engine 22 may be used to both propel the vehicle 18 by transmitting torque to the wheels 66 while also transmitting torque to the motor 26 for generating electricity to charge the battery portion 30. After step 230, the method returns to step 200. In step 200, the controller 32 detects whether user has selected another mode and overridden the command for silent mode preparation.

The desirability of the silent preparation mode is included since many hybrid electric vehicles may not normally operate the vehicle with the battery portion 30 at a high state of charge. That is, the state of charge of the battery portion 30 will vary during operation. In an exemplary approach, the controller 32 targets the state of charge toward sixty percent (60%), although other values or ranges of percentages of state of charge may be used. The state of charge of the battery portion 30 when the silent mode is selected may not provide sufficient range (distance) for operation of the vehicle during electric only propulsion. During the loop that include steps 200, 210, 220, and 230, the controller 32 will charge the battery portion until either the battery portion has reached the start state of charge, or until the user selects the silent mode or the parallel hybrid (normal) mode. That is, for example, the battery will be charged from about sixty percent (60%) to about eighty percent (80%) state of charge during the silent preparation mode to provide greater range during silent mode operation.

In step 240, the controller 32 will operate the vehicle 18 in the electric only mode. Operation in the electric only mode may include at least one of limiting the speed of the vehicle 18, limiting acceleration of the vehicle 18, using the regenerative braking system 80 to a greater extent than normal, preventing a start of the engine 22, detecting the battery portion 30 state of charge, estimating the range (distance that the vehicle is capable of traveling at the current state of charge), and notifying the user of the range value and a state of charge value. The method may then proceed to step 250.

In step 250, the controller 32 will determine whether the battery portion 30 state of charge is below a desired low state of charge. If the determination in step 250 is positive, the logic may continue to step 260, if the determination in step 250 is negative, the method may continue to step 270.

In step 260, the controller 32 will notify the user that the state of charge of the battery portion 30 is below the low state of charge value. Then the method may proceed to step 280. The notification of step 260 may be the normal indication given to the user of the state of charge, or may be a flashing indicator or sound.

In step 270, the controller will determine whether the user has de-selected the silent mode. If the determination in step 270 is positive, the logic may continue to step 290; if the determination in step 270 is negative, the method may return to step 240.

In step 280, the controller will determine whether the user has de-selected the silent mode. If the determination in step 280 is positive, the logic may continue to step 290; if the determination in step 280 is negative, the method may continue to step 300.

In step 290, the controller will return to operate the vehicle in the normal hybrid mode where a controller, such as the controller 32, does not operate with the limitations of step

240. That is, the controller 32 may start the engine 22 and may reset any limits imposed by the logic of step 240 on the operation of the vehicle 18.

In step 300, the controller 32 will determine whether the battery state of charge is below a cutoff level. In one exemplary illustration, the cutoff state of charge is about 30 percent (30%) of maximum charge while the low state of charge is about 35 percent (35%) of maximum charge. If the determination in step 300 is positive, the logic continues to step 310, if the determination in step 300 is negative, the method returns to step 280. For this exemplary illustration, the battery portion 30 would likely experience damage if discharged below 30% of maximum charge (SOC).

In step 310, the controller 32 will shut down the motor 26 and any other electronic systems that draw power from the battery portion 30. Since the user has been notified in step 260 that this the battery state of charge is below the low state of charge, then the user has an amount of time to move the vehicle to a location where the silent mode is not desired, or may wait (without propelling the vehicle) until the silent mode is no longer desired at the current location.

Although the operations of step 240 may occur simultaneously or near simultaneously with the determinations of steps 250, 270, 280, and 310, the results of step 290 in the exemplary illustration is the determination that will cease silent mode operations of step 240.

Figure 3:
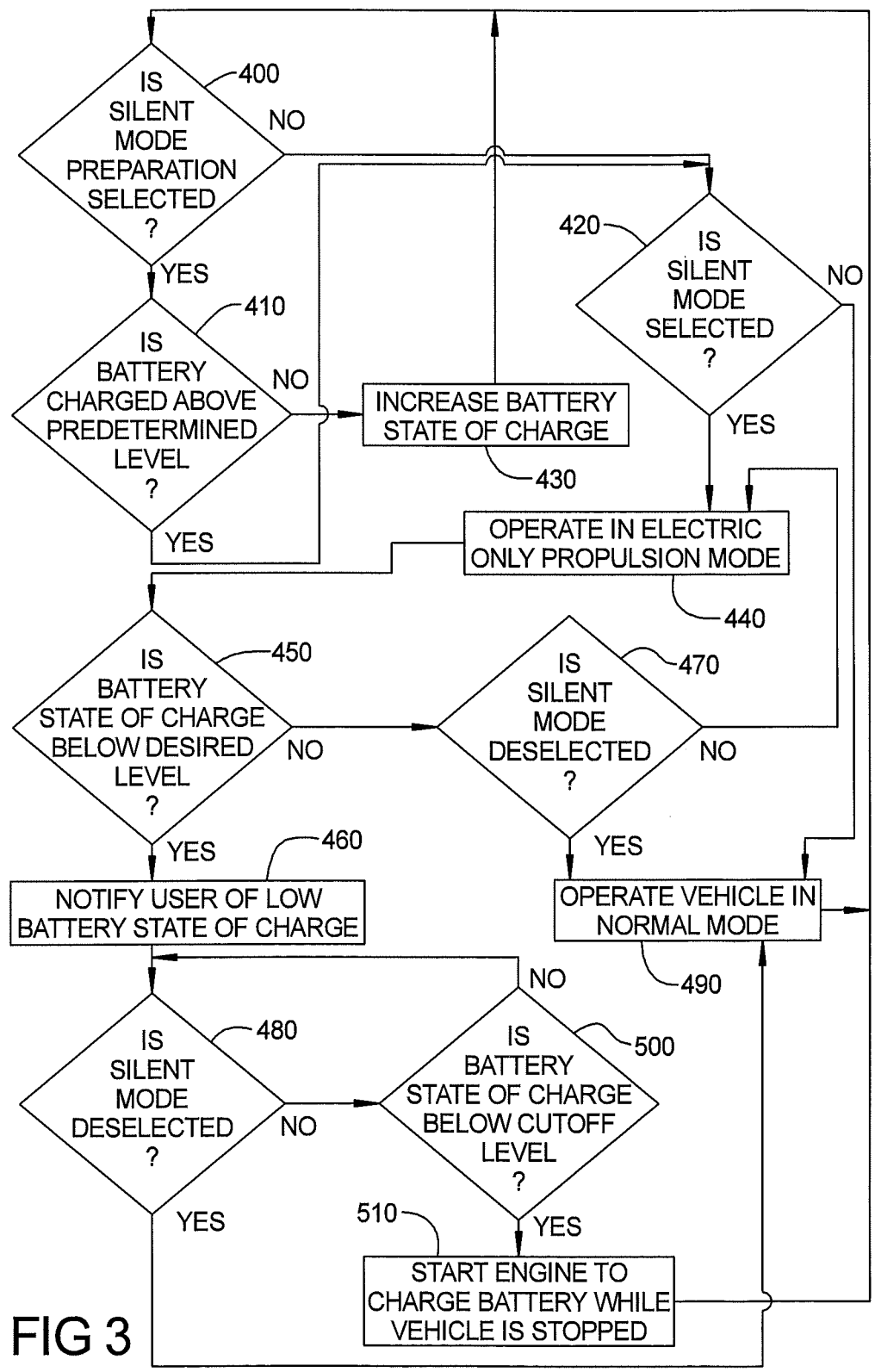
FIG. 3 is a flow chart illustrating steps of a method according to an exemplary embodiment.

FIG. 3 illustrates an exemplary flowchart of a method according to an illustrative embodiment. The method may begin in step 400 where a controller, such as the controller 32 may determine whether the user has selected the silent preparation mode. If the determination in step 400 is positive, the logic may continue to step 410. If the determination in step 400 is negative, the method may continue to step 420.

In step 410, the controller 32 will determine whether the battery portion 30 is charged above a predetermined start state of charge. The start state of charge may be dependent upon other variables of the vehicle 18, but generally, the start state of charge will be established as a value of state of charge at the higher end of the battery capacity. In one embodiment, the start state of charge will be about ninety percent (90%) of maximum. If the determination in step 410 is positive, the logic may continue to step 420. If the determination in step 410 is negative, the method may continue to step 430.

In step 420, the controller will determine whether the user has selected the silent mode. If the determination in step 420 is positive, the logic may continue to step 440. If the determination in step 420 is negative, the method may continue to step 490 (discussed in greater detail below).

In step 430, the controller will charge the battery portion 30. In the silent preparation mode, (the loop that include steps 410 and 430) the controller 32 will operate the engine 22 to charge the battery portion 30 to a start state of charge. That is, since the controller 32 may operate the motor 26 as a generator, the engine 22 may be used to both propel the vehicle 18 by transmitting torque to the wheels 66 while also transmitting torque to the motor 26 for generating electricity to charge the battery portion 30. After step 430, the method may return to step 400.

The desirability of the silent preparation mode is included since many hybrid electric vehicles may not normally operate the vehicle with the battery portion 30 at a high state of charge. That is, the state of charge of the battery portion 30 will vary during operation. The state of charge of the battery portion 30 when the silent mode is selected may not provide sufficient range (distance) for operation of the vehicle during electric only propulsion. During the loop that include steps 400, 410, 440, and 450, the controller 32 may charge the battery portion until either the battery portion has reached the start state of charge, or until the user selects the silent mode.

In step 440, the controller 32 will operate the vehicle 18 in the electric only mode. Operation in the electric only mode includes at least one of limiting the speed of the vehicle 18, limiting acceleration of the vehicle 18, using regenerative braking to a greater extent than normal, preventing a start of the engine 22, detecting the battery portion 30 state of charge, estimating the range (distance that the vehicle is capable of traveling at the current state of charge), and notifying the user of the range value and a state of charge value.

In step 450, the controller 32 will determine whether the battery portion 30 state of charge is below a desired low state of charge. If the determination in step 450 is positive, the logic may continue to step 460. If the determination in step 450 is negative, the method may continue to step 470.

In step 460, the controller 32 will notify the user that the state of charge of the battery portion 30 is below the low state of charge value, then the method may proceed to step 480.

In step 470, the controller will determine whether the user has de-selected the silent mode. If the determination in step 470 is positive, the logic may to step 490. If the determination in step 470 is negative, the method may return to step 440.

In step 480, the controller will determine whether the user has de-selected the silent mode. If the determination in step 480 is positive, the logic may continue to step 490. If the determination in step 480 is negative, the method may continue to step 500.

In step 490, the controller will return to operate the vehicle in the normal hybrid mode where a controller, such as the controller 32, does not operate with the limitations of step 440. That is, the controller 32 may start the engine 46 and may reset any limits imposed by the logic of step 440 on the operation of the vehicle 18.

In step 500, the controller 32 will determine whether the battery state of charge is below a cutoff level. In one example, the cutoff state of charge is about fifty percent (50%) of maximum charge while the low state of charge is about fifty-five percent (55%) of maximum charge. If the determination in step 500 is positive, the logic may continue to step 510. If the determination in step 500 is negative, the method may return to step 480.

In step 510, the controller 32 will discontinue using the motor 26 from propelling the vehicle 18 and may shutdown any other electronic systems that draw power from the battery portion 30. The engine 22 is started and idled to charge the battery portion 30 using the motor 26 as a generator. That is, the engine 22 is permitted to start, and is operated in a relatively quiet mode while charging the battery portion 30. To operate the engine 22 while emitting a low level of noise, the engine may be limited to less than one-thousand (1000) revolutions per minute (rpm), or other speeds. When selecting the alternative mode of FIG. 3, the vehicle 18 may detect the background noise levels with the decibel meter 40 to determine whether the engine 22 may be started. That is, if the background noise levels are sufficient to mask the operation of the engine 22 (noise levels emitted during operation of the engine 22 being used to charge the battery portion 30), then the engine 22 may be operated to charge the battery portion 30.

Although the operations of step 440 occur simultaneously or near simultaneously with the determinations of steps 450, 470, 480, and 510, the determination of step 490 in the exemplary illustration is the determination that will cease silent mode operations of step 440.

Additionally, the controller 32 may also permit an engine 22 start while in the electric only mode to provide an engine start override mode during the electric only mode. This start may include idling the engine 22 to prevent disabling the vehicle 18 due to discharging the battery portion 30 to a state of charge value that would be incapable of restarting the engine 22. In the engine start override mode, the engine 22 may be started while limiting the rotational speed of the engine 22 to reduce the noise generated by the engine 22 during operation. Further, the engine 22 may not be used to propel the vehicle 18 or charge the battery portion 30 in the engine start override mode while the battery portion 30 is discharged below the predetermined first mode low state of charge. Therefore, the vehicle may be used silently while discharging the battery portion 30 below the low state of charge value. Although this engine start override mode may result in damage to the battery due to discharging the battery below a desired state of charge value, the range of the vehicle may be increased while avoiding the emission of noise associated with generating electricity to charge the battery portion 30 and permitting the vehicle to continue to operate when needed since the engine 22 may be used to charge the battery or propel the vehicle 18 if desired (the engine 22 is operating and being unable to start the engine 22 is not a concern).

In steps 240 and 440, the controller 32 will operate the vehicle 40 in the electric only mode. As mentioned above, these operations may include at least one of limiting the speed of the vehicle 18, limiting acceleration of the vehicle 18, using regenerative braking to a greater extent than normal, preventing a start of the engine 22, detecting the battery portion 30 state of charge, estimating the range (distance that the vehicle is capable of traveling at the current state of charge), and notifying the user of the range value and a state of charge value. These limitations are directed toward increasing the range of the vehicle 18 during operation in the electric only mode.

To estimate the range capability of the vehicle 18 in the electric only mode, the controller 32 may include a look-up chart that roughly equates the determined state of charge to previous values of distances that similar vehicles have traveled with an equivalent state of charge, or the controller 32 may include an algorithm to calculate a range value based upon state of charge and other factors, such as average speed of vehicle while in electric only mode. Additionally, a speed in relation to time value may be displayed to the user to indicate to the user a range value that is indicative of a calculated distance available until the battery reaches the low state of charge.

The battery state of charge may be determined by methods that include electrolyte pH levels, voltage, current, temperature, amperes, and/or Peukert's Law. Exemplary state of charge monitors are illustrated in U.S. Pat. Nos. 5,656,919; 6,417,668; and 7,123,133, the disclosures of which are incorporated by reference in its entirety.

As used herein, the term "state of charge" refers generally to, as is commonly understood by one of skill in the art, the "amount" of charge of a battery (the battery's level of charge, usually expressed as a percentage of full or maximum) which is roughly equivalent to the amount of chemical energy stored in the battery at any given time. Generally, a battery may be damaged when discharging the battery below a state of charge value. That is, when a battery is discharged below a value of, for example, approximately thirty percent (30%) of maximum state of charge, the battery may not be desirably discharged below this value until the battery has been at least partially charged. Many hybrid electric vehicles do not operate with the battery at a high state of charge, but will operate with the battery at a medium state of charge (for example, 50%-70%) to gain the maximum fuel efficiency for the vehicle (to always have the ability to charge or discharge the battery).

Although the steps of the method of operating the system 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method of operating a hybrid electric drive train, the drive train comprising an electric motor and an internal combustion engine, each capable of propelling a vehicle, the method comprising:
   providing a manually selectable first mode, wherein the first mode includes an electric mode; and
   after the first mode is selected, operating in the first mode, including:
      detecting a battery state of charge;
      comparing the battery state of charge to a threshold;
      if the battery state of charge exceeds the threshold, entering the electric mode, the electric mode comprising:
         propelling the vehicle using only the electric motor;
         limiting an allowed vehicle acceleration to below a predetermined acceleration value; and
         preventing an engine start; and
      providing an override option, wherein the override option allows for starting the engine while otherwise maintaining operation in the electric mode, where maintaining operation in the electric mode includes not using the engine to propel the vehicle.

2. The method of claim 1, wherein the first mode further includes increasing an amount of charge in a battery portion beyond a hybrid mode charging limit prior to the propelling the vehicle using only the electric motor, where the hybrid mode charging limit is an amount of charge above which the battery portion is not charged during operation in a hybrid mode.

3. The method of claim 2, wherein increasing the amount of charge includes operating the internal combustion engine to drive the electric motor and operating the electric motor as a generator to charge the battery portion.

4. The method of claim 3, wherein operating in the first mode further comprises notifying when a state of charge is below a first predetermined value.

5. The method of claim 4, wherein when a battery state of charge is below a second predetermined value lower than the first predetermined value, operation in the electric mode is ceased, except that if the override option has been selected, operation in the electric mode is not ceased when the battery state of charge is below the second predetermined value and the engine is started and not allowed to propel the vehicle or to charge the battery.

6. The method of claim 5, further comprising preventing a discharging of the battery below an approximately forty percent state of charge while in a hybrid mode, wherein the engine will automatically start to charge the battery during operation in the hybrid mode, and wherein the second predetermined value is less than or equal to thirty percent state of charge.

7. The method of claim 1, wherein operating in the first mode further comprises notifying a user of an estimated vehicle availability value, the vehicle availability value including at least one of: a distance available for operation in electric mode, and a time remaining in electric mode.

8. The method of claim 1, wherein the predetermined acceleration value may be selectively adjusted during operation in electric mode.

9. The method of claim 1, wherein operating in the first mode further comprises at least partially recharging a battery portion with a regenerative brake.

10. The method of claim 1, wherein detecting the battery state of charge includes estimating available battery power based upon an estimated discharge rate and battery state of charge.

11. A method of operating a hybrid electric drive train comprising:
receiving an indication of a manual selection of a first mode, wherein the first mode includes an electric mode that includes propelling a vehicle using only an electric motor; and
after receiving the indication:
comparing a battery state of charge to a threshold, and if the battery state of charge exceeds the threshold:
propelling the vehicle in the electric mode; and
preventing an engine start during operation in the electric mode while propelling the vehicle using only the electric motor; and
providing an option for a user override, wherein the user override allows an engine start while otherwise maintaining operation in the electric mode, where maintaining operation in the electric mode includes not using the engine to propel the vehicle.

12. The method of claim 11, further comprising, when a user override option has been selected, preventing the engine from exceeding a rotational speed of approximately one-thousand revolutions per minute.

13. The method of claim 11, further comprising preventing a discharge of a battery below an approximately forty percent state of charge while in a hybrid mode, wherein the engine will automatically start to charge the battery during operation in the hybrid mode.

14. The method of claim 11, further comprising, when operating in the electric mode, limiting an allowed vehicle acceleration below a predetermined acceleration value wherein the predetermined acceleration value is less than a maximum acceleration value attainable by the vehicle and limiting the allowed vehicle acceleration does not require limiting a vehicle speed or load.

15. The method of claim 14, wherein limiting the allowed acceleration includes limiting the rotational speed of the motor when in the electric only mode to a value below a speed permitted in a hybrid mode, wherein the electric motor and the engine are permitted to propel the vehicle during the hybrid mode.

16. The method of claim 11, further comprising notifying the user of an estimated vehicle availability value, wherein the vehicle availability value includes at least one of: distance available for operation in electric mode, and time remaining in electric mode.

17. The method of claim 11, wherein the first mode further includes increasing an amount of charge in a battery portion beyond a hybrid mode charging limit prior to the propelling the vehicle using only the electric motor, where the hybrid mode charging limit is an amount of charge above which the battery portion is not charged during operation in a hybrid mode.

18. The method of claim 17, wherein increasing the amount of charge includes operating an internal combustion engine to drive the electric motor and operating the electric motor as a generator to charge the battery portion.

19. The method of claim 18, further comprising, when operating in the first mode, notifying the user when a state of charge is below a first predetermined value.

20. The method of claim 19, further comprising shutting down the motor when a state of charge of the battery portion is below a second predetermined value lower than the first predetermined value.

21. The method of claim 1, further comprising notifying a user of a maximum acceleration rate available in electric mode.

22. The method of claim 11, further comprising notifying the user of a maximum acceleration rate available in electric mode.

* * * * *